United States Patent [19]
DeMaio, Jr. et al.

[11] Patent Number: 5,167,969
[45] Date of Patent: Dec. 1, 1992

[54] SPLIT FRAME FOR ROTARY VACUUM MOLD UNIT

[76] Inventors: Joseph T. DeMaio, Jr., P.O. Box 300; John J. Salva, 24 Peacock St., both of Auburn, N.Y. 13021

[21] Appl. No.: 682,253

[22] Filed: Apr. 9, 1991

[51] Int. Cl.⁵ .............................................. B29C 51/00
[52] U.S. Cl. .................................. 425/388; 249/158; 264/297.8; 425/385
[58] Field of Search ................ 249/82, 155, 158, 159; 264/322, 297.7, 297.8; 425/185, 388, 385, 403.1, DIG. 14, DIG. 48; 156/499

[56] References Cited

U.S. PATENT DOCUMENTS

| | | | |
|---|---|---|---|
| 3,277,224 | 10/1966 | Whiteford | 425/388 |
| 3,583,036 | 6/1971 | Brown | 425/388 |
| 3,597,799 | 8/1971 | Earle | 425/388 |
| 3,779,687 | 12/1973 | Alesi | 425/388 |
| 3,810,731 | 5/1974 | Anderson | 425/388 |
| 3,868,209 | 2/1975 | Howell | 425/388 |
| 4,018,551 | 4/1977 | Shuman | 425/388 |
| 4,097,035 | 6/1978 | Shuman | 425/388 |
| 4,099,901 | 7/1978 | Shuman | 425/388 |
| 4,637,789 | 1/1987 | Netzik | 425/388 |
| 4,836,762 | 6/1989 | Davis, Jr. | 425/388 |

*Primary Examiner*—David A. Simmons
*Assistant Examiner*—William J. Matney, Jr.
*Attorney, Agent, or Firm*—Wall and Roehrig

[57] ABSTRACT

An auxiliary double frame for a rotary vacuum mold unit or rotary thermoformer has a center auxiliary frame member and one or more auxiliary transverse frame members. The thermoformer has several identical frames that carry the plastic sheet workpieces from a load/unload station to a heat station or an oven, then to a vacuum molding station, and then to the load/unload station where the molded product is removed and replaced with a blank plastic workpiece. A center auxiliary frame member is mounted onto the front and back main frame members, and can be positioned on center or to the right or left of the center of the frame. Auxiliary transverse frame members are employed with the standard transverse clamping frame members. Pneumatic cylinders mount on the transverse clamping frame members and on the longitudinal frame members for operating pinbars. This system permits two or more molds to be employed at the same time.

7 Claims, 6 Drawing Sheets

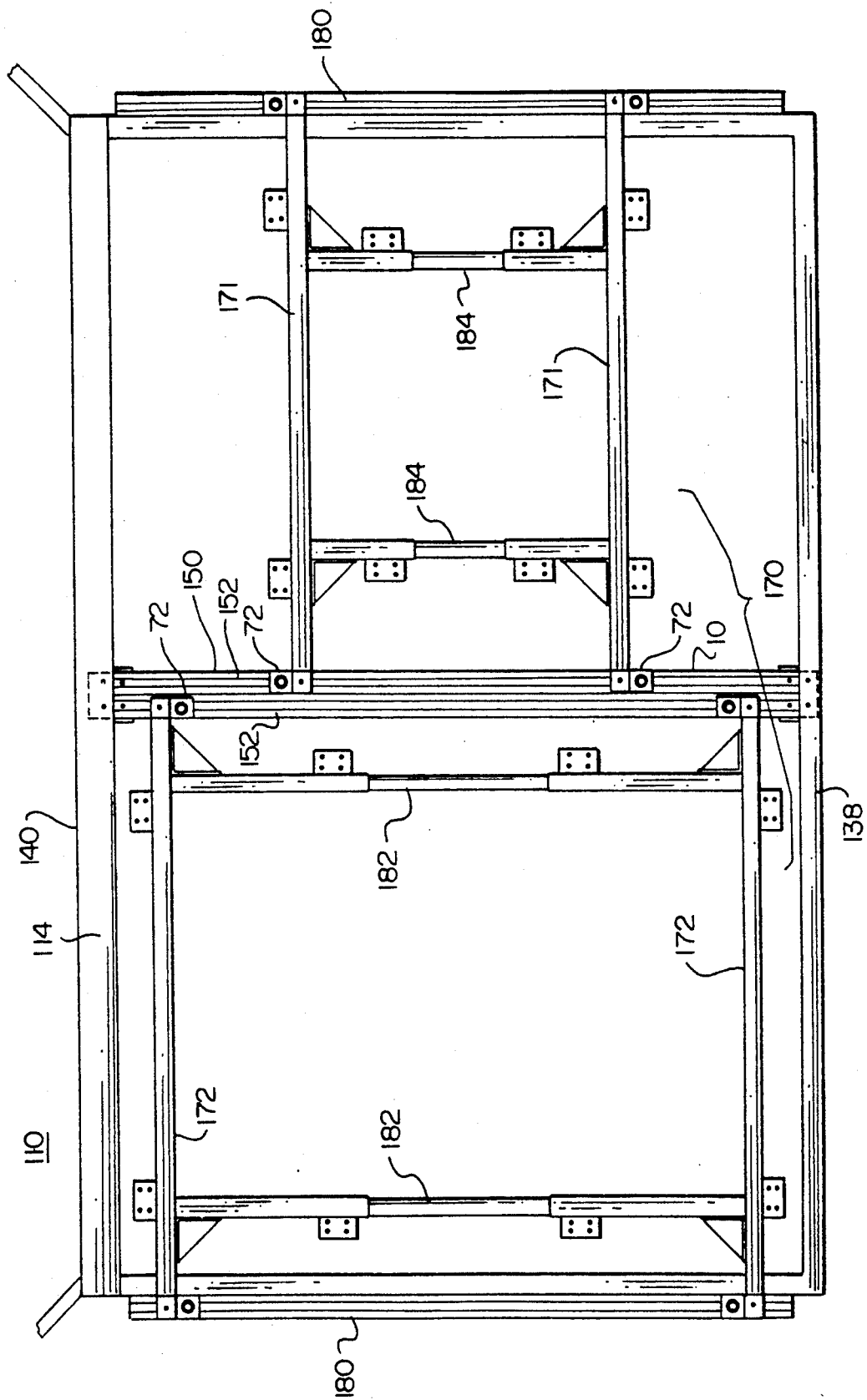

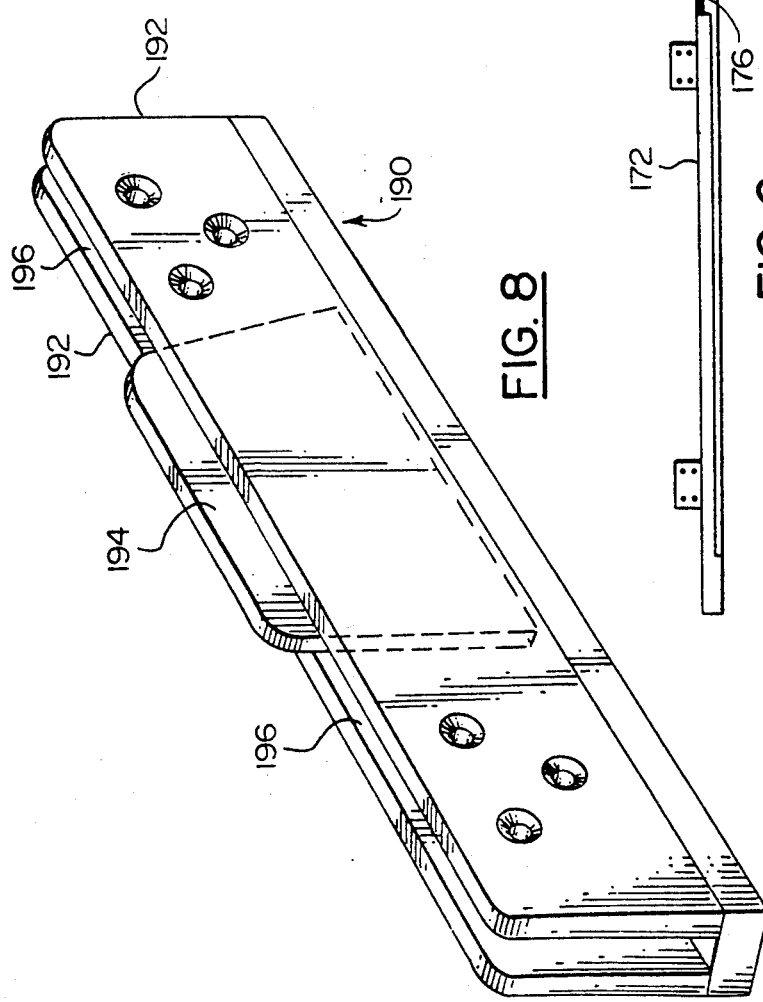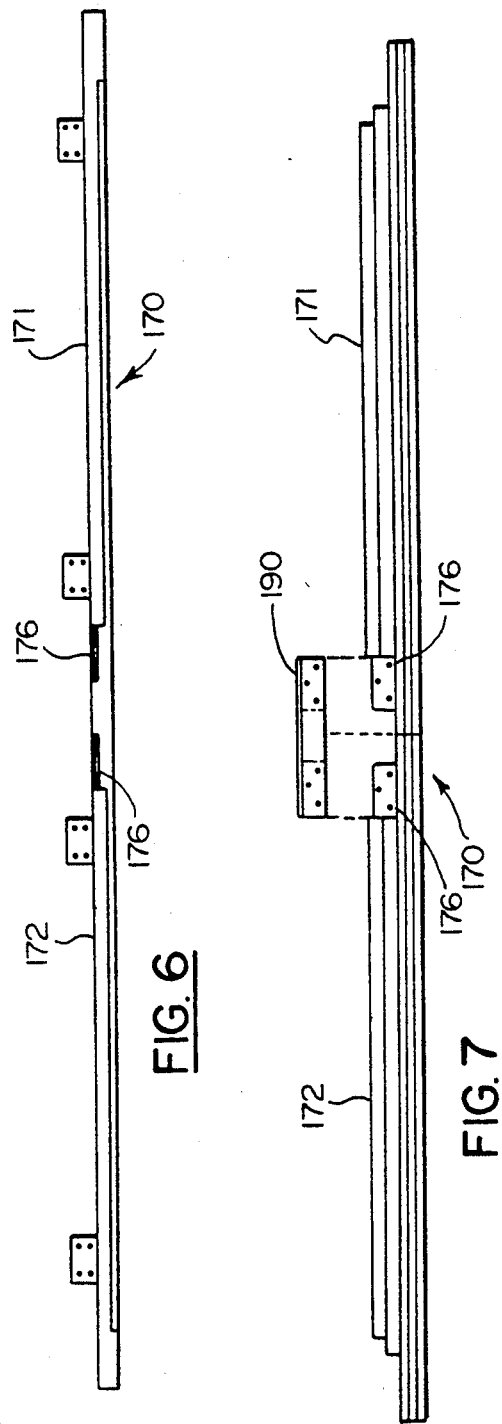

SPLIT FRAME FOR ROTARY VACUUM MOLD UNIT

BACKGROUND OF THE INVENTION

This invention is directed to apparatus for vacuum molding of thermoplastic workpieces, and is more particularly directed to rotary thermoformers in which a plastic workpiece is loaded to a frame at a loading station, and carried to a heating station, and then to a molding station, and then to an unloading station where the finished molded workpiece is removed from the frame.

A standard rotary thermoformer has a carousel that contains three, four, or five standard frames disposed about a vertical rotary axis. Each of the frames has a front main frame member, a back main frame member, and left and right side frame members. These each carry a set of clamp frames. The clamp frames consist of front and back clamp frame members that are suspended at each end from the side frame members, and side clamp frame members that are supported between the front and back clamp frame members. The front and back clamp frame member positions are adjustable, as are the positions of the side frame members, so that the clamp frame dimensions can match the workpiece dimensions. The side clamp frame members can have a telescoping construction so that their lengths match the spacing between the front and back clamp frame members. Pneumatic clamps and pinbars are installed on the clamp frame to hold the workpiece in place as it is carried from station to station.

For a single mold at or close to the size of the frame capacity, the standard front, back and side clamps would be used as is, and only a single mold could be employed. However, if two or more smaller molds are to be run simultaneously it is possible to run two mold jobs at once on the same thermoformer, but only if a number of constraints are satisfied.

With this standard system, there is very little flexibility in accommodating more than one molding job at the same time. A standard double mold set up can be accomplished in two ways, both of which require that the workpieces have a common dimension (i.e. length or width).

If sheet factors permit (i.e., sheet type, sheet color, sheet gauge, direction of extrusion, etc.) and if the work pieces have one common dimension, then the molds can be butted together and one larger sheet can be run to cover both molds. In this situation, a standard single-frame set up would suffice. However, an extra mold step, that is, cutting apart the two molded workpieces, is required.

A second method can be used if the sheet factors are different, as long as the molds still have one common dimension. In this method the standard front and back clamp frames are used, but there are two sets of side clamp frames for each step.

If a smaller-dimension mold is used with a larger one, this second method could be used, but a larger workpiece would be needed for the smaller mold. This requires a trimming step to trim the excess plastic sheet after molding. The extra labor and the plastic waste factor can make this procedure economically unfeasible.

The plastics molding industry has long sought a straight-forward, reliable, and economic procedure to maximize the capacity of rotary thermoformers, but to date this goal has proved elusive.

OBJECTS AND SUMMARY OF THE INVENTION

It is an object of this invention to increase the output of a rotary thermoformer by using two or more portions of each frame to carry workpieces which can have different sheet factors and different dimensions.

It is another object of this invention to provide an auxiliary frame that can be attached onto the main frame for running multiple molding operations and yet will permit the frame to be used up to its full capacity for large single mold operations.

In accordance with the above objects, there is a split auxiliary frame with a center auxiliary frame member that extends parallel to the side frame members and has its ends supported on the front and back frame members. The front transverse clamp frame rail or the back transverse clamp rail can be used for two workpieces, one disposed to the right and one to the left of the center auxiliary frame member. An auxiliary transverse clamping frame member extends from one of the side frame members to the center member. Telescoping longitudinal rails are supported between the transverse rails on the left and right for each workpiece, and pneumatic clamps and pinbars (or other suitable clamping means) are installed in the customary fashion.

The center frame member can be attached onto front and back channel members that are affixed to the front and back main frame members. This permits lateral adjustment of the position of the center frame member. This permits multiple mold operation, where one mold extends more than halfway across the frame capacity. An adjustable slide on the center frame member permits the auxiliary transverse members to be installed at any desired position in the fore and aft direction on the frame. Three, four, or more smaller mold jobs can be accommodated in a single mold operation.

In an alternative embodiment, a central double-channel rail is employed, and the front and back transverse clamping frame members are split into left and right halves. These have their inner ends adjustably supported on the central double-channel rail. For a single large mold, the center rail is removed and the split clamping frame members are united, using a clamping bracket for each of the front and back transverse clamping frame members.

The auxiliary clamping frame members are easily installed using standard tools and fasteners, and with only a minimum of down time.

The above and many other objects, features, and advantages of this invention will be more fully appreciated from the ensuing description of selected preferred embodiments, to be read in conjunction with the accompanying Drawing.

BRIEF DESCRIPTION OF THE DRAWING

FIG. 5 is a bottom plan view of a mold frame according to an alternative embodiment.

FIGS. 6 and 7 are top and front views of a pair of split transverse clamp frame members of the alternative embodiment.

FIG. 8 illustrates a clamp bracket for uniting the split transverse clamp frame.

DETAILED DESCRIPTION OF THE PREFERRED EMBODIMENT

Figure 1:
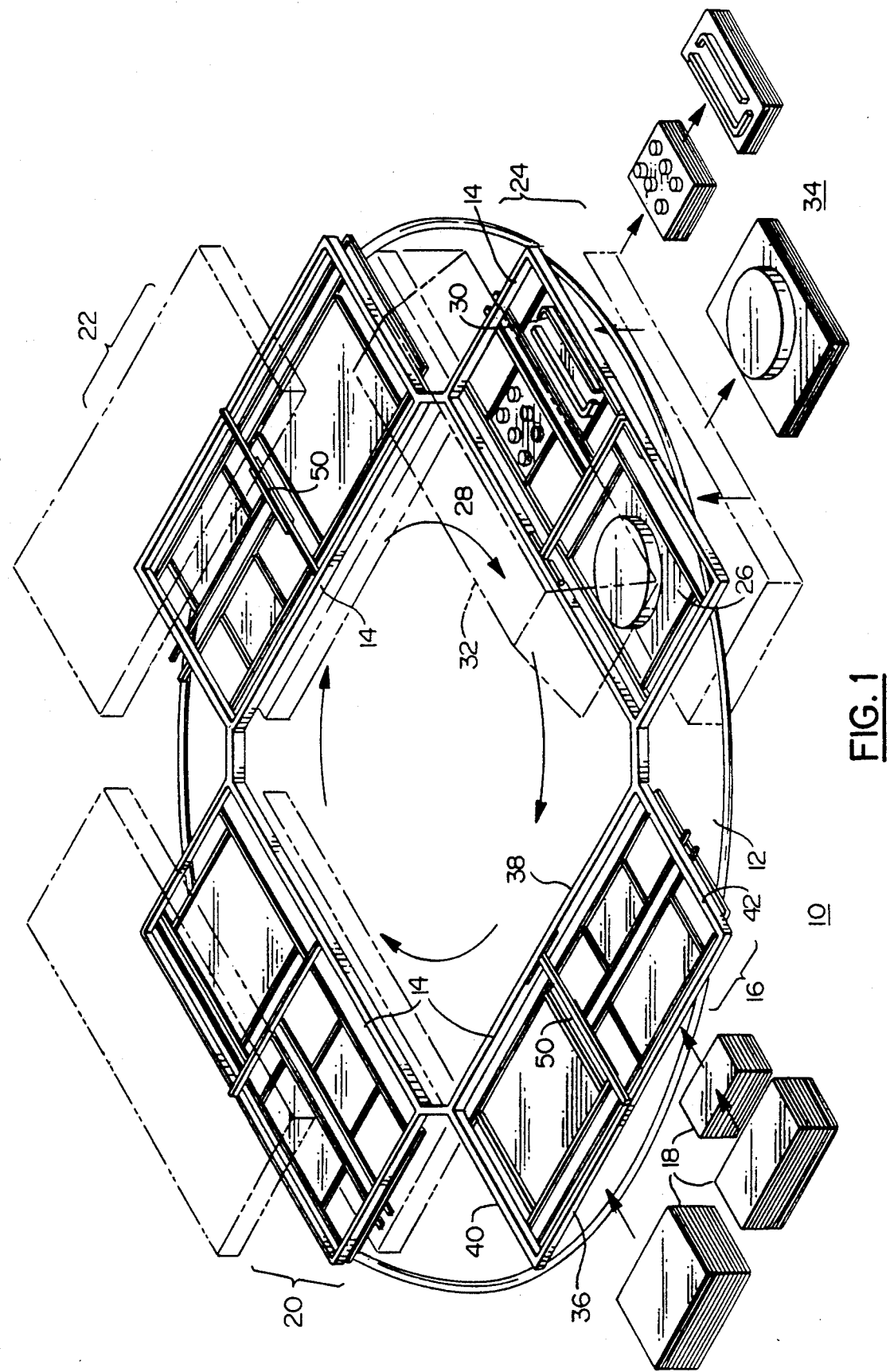
FIG. 1 is a schematic perspective view of a rotary thermoformer which incorporates a split auxiliary clamping frame of this invention.

With reference to the Drawing, FIG. 1 illustrates a rotary vacuum mold apparatus or rotary thermoformer 10 which incorporates a rotary carousel 12, here with four main frames 14 spaced at 90 degree intervals. In other versions, there could be three frames at 120 degrees, and still other versions there could be five frames or six frames. Each of the main frames 14 is rotated stepwise 90 degrees in the clockwise direction. At a load/unload station 16, workpieces 18 of various sizes of thermoplastic sheet are loaded and these are then carried on the frame to a preheat station 20. From there, the workpieces are rotated to a second heating station 22, and then the heated workpieces are brought to a molding station 24. At this position, first, second and third vacuum molds 26, 28 and 30 are raised up to contact the softened workpieces, and vacuum is applied to cause the workpieces to conform to the shapes of the molds. When the molding step is complete, the vacuum molds 26, 28, and 30 are lowered.

Shown in ghost lines is a hood 32 which contains fans or other air handling equipment to effect controlled cooling of the workpieces 18, while on the molds.

From the molding workstation 24, the carousel is rotated back to the load/unload station 16. Here, the workpieces are removed as molded products 34, and are stacked for subsequent utilization or shipment.

Figure 2:
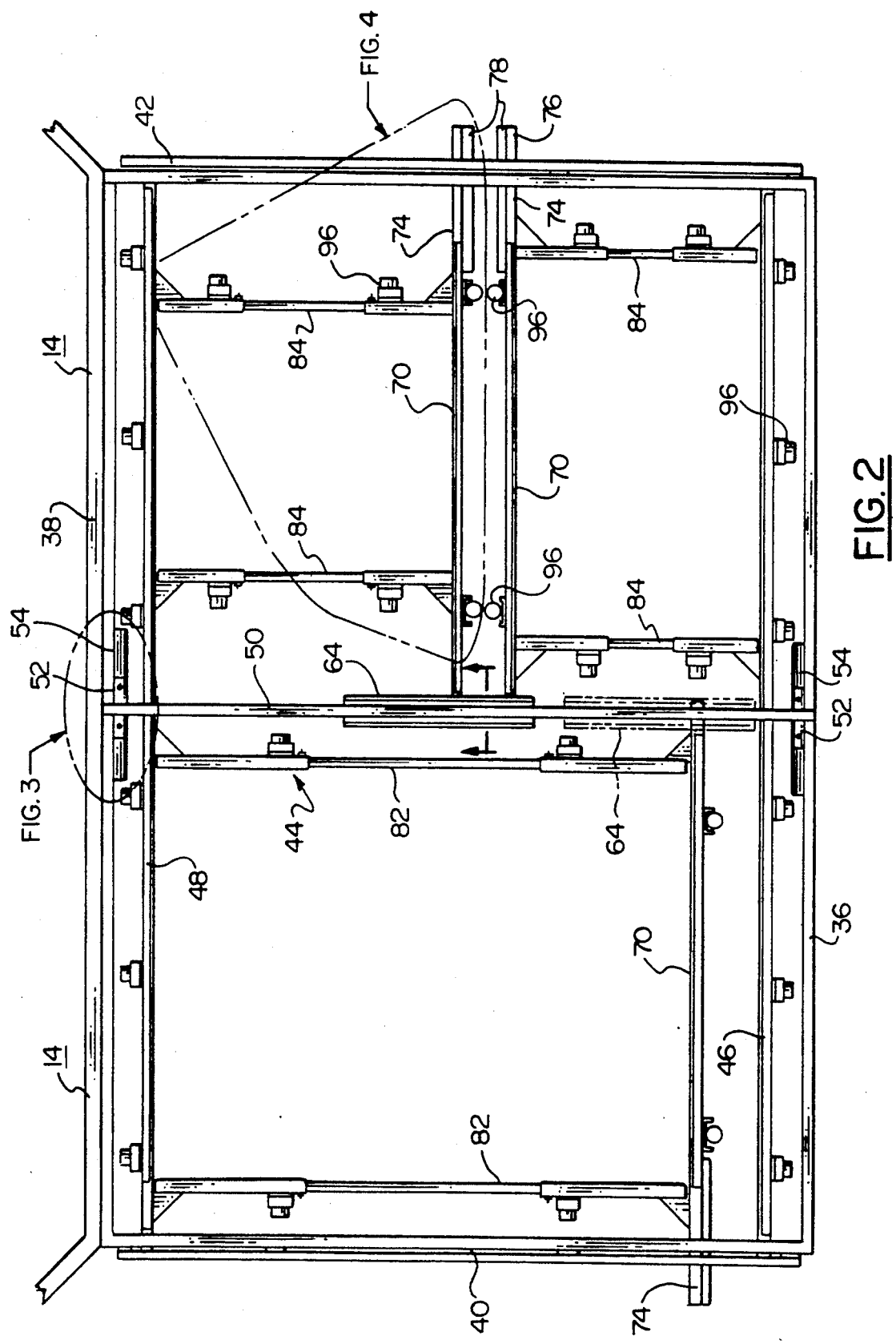
FIG. 2 is a top plan view of one mold frame according to one preferred embodiment of this invention.

As shown in FIG. 2, each of the frames 14 consists of a front frame member 36, a back frame member 38, a left side frame member 40 and a right side frame member 42, these four members being arranged in a horizontal rectangular configuration. Supported within the main frame 14 is a clamping frame 44 which includes a front transverse frame member 46 and a back transverse member 48. The ends of these two members 46 and 48 are supported on the left and right side frame members 40 and 42, and the fore-and-aft or Y-dimension spacing between the transverse frame member 46 and 48 is adjustable over the length of the two side frame members 40 and 42.

Figure 3:
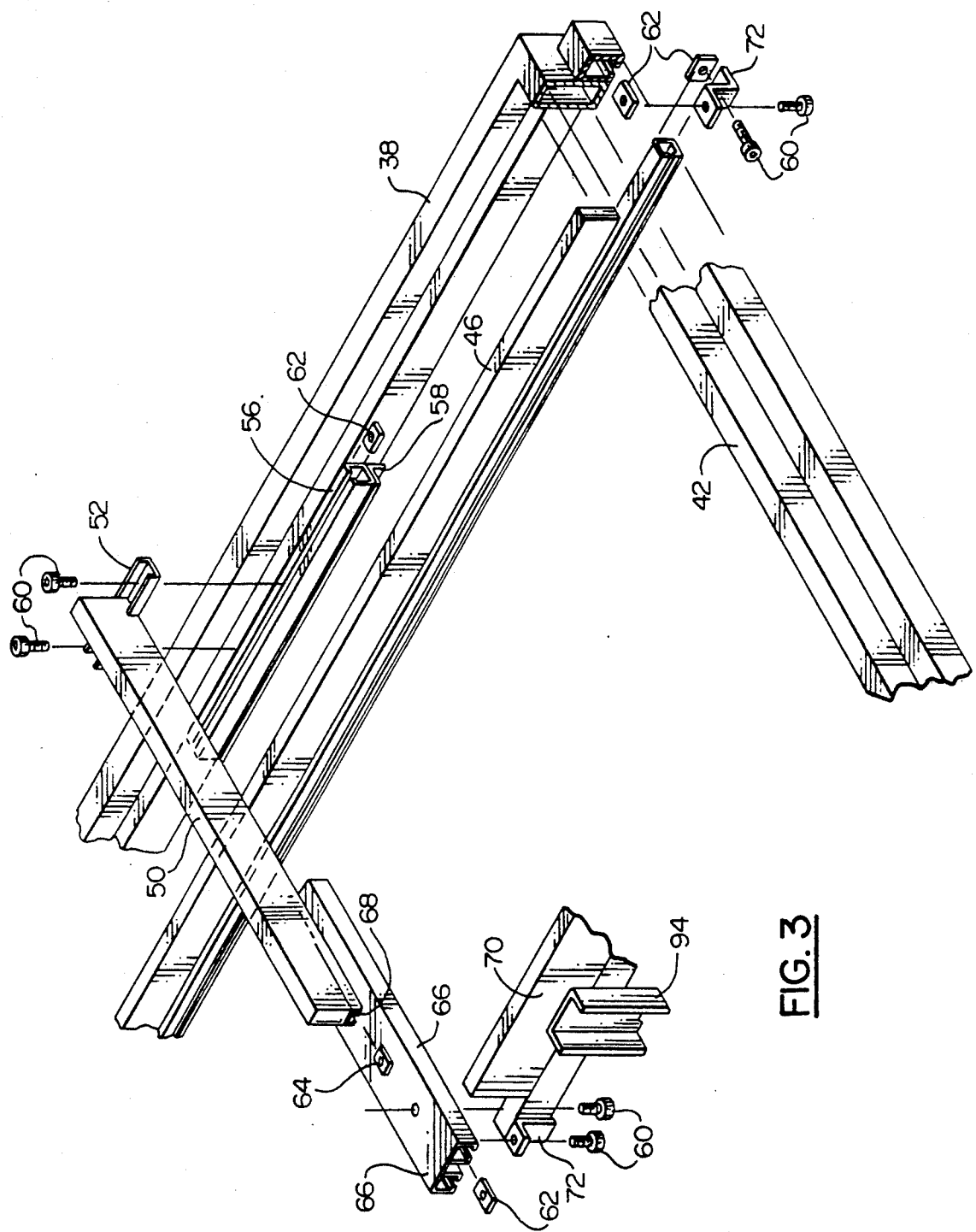
FIGS. 3 and 4 are partial exploded assembly views of portions of this embodiment, as respectively indicated on FIG. 2.

A center auxiliary frame member 50 is supported between the front and back main frame members 36, 38, and extends parallel to the side frame members 40 and 42. As shown in FIG. 3, the center auxiliary frame member 50 has a transverse foot 52 at each end which is supported on a center auxiliary frame mount 54. There are front and back mounts 54 supported respectively on the front and back frame members 36, 38. The mounts 54 each comprise a slotted channel 56 that extends transversely atop a bracket 58, the latter being removably attached onto the respective frame member 36 or 38. Bolts 60 and channel nuts 62 attach the transverse foot 52 of the member 50 onto the mount 54. Lips on the open side of the channel 56 define a slot for retaining the connecting hardware such as the channel nuts 62.

Also forming a part of the center auxiliary frame member 50 is an auxiliary frame slide 64 that is formed of a pair of side-by-side channels 66. The slide 64 connects by means of bolts 60 and channel nuts 62 to a slotted channel 68 situated on an under side of the center auxiliary frame member 50. The position of the slide 64 is adjustable as desired along the frame member 50, and can be positioned, for example, at the center of the frame member 50 as shown in solid line in FIG. 2 or at one end as shown in broken line. For a given molding operation, more than one auxiliary frame slide 64 can be attached to the center auxiliary frame member 50.

Figure 4:
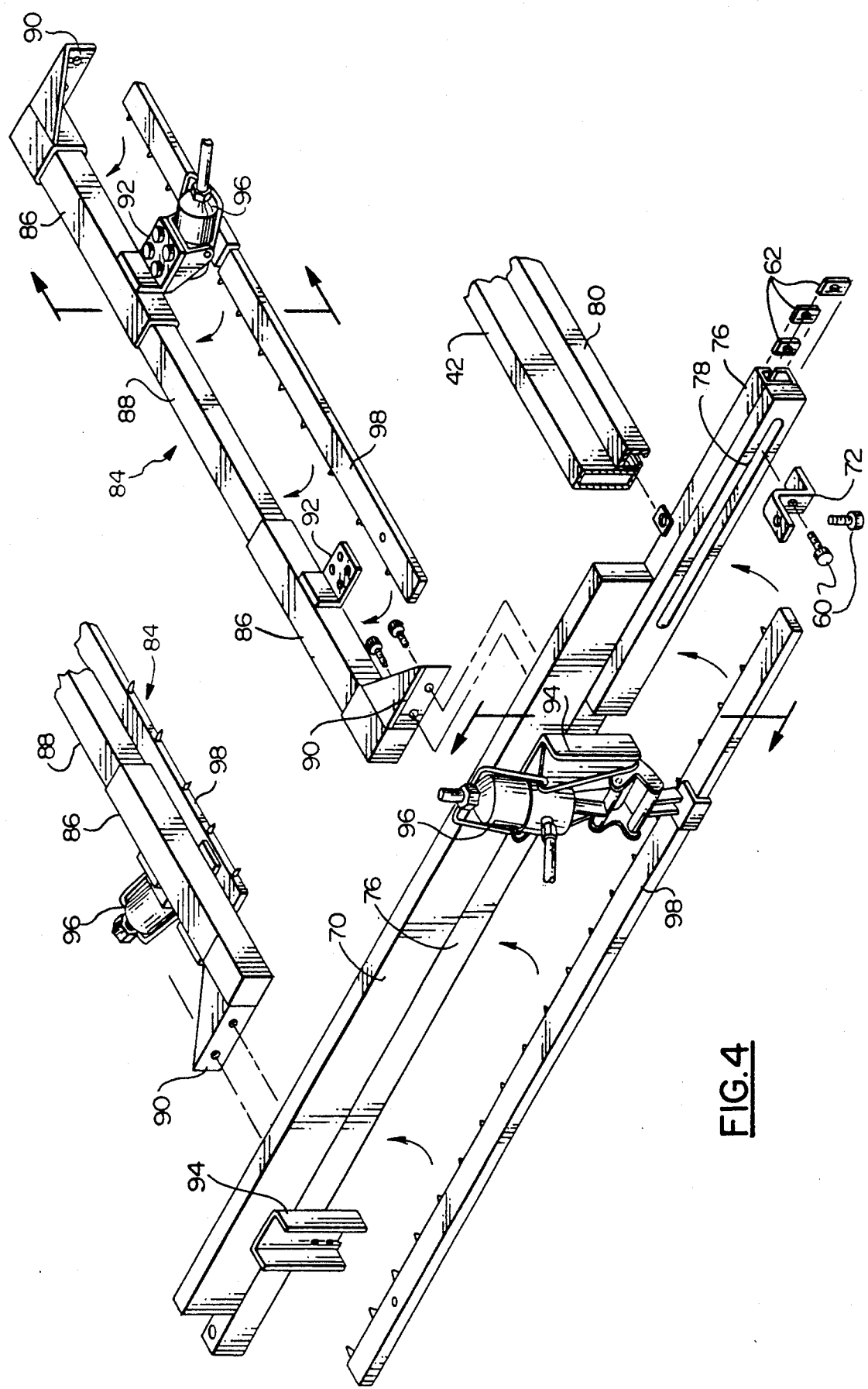

As shown in part in FIG. 3 and more fully in FIG. 4, one or more transverse auxiliary clamp frame members 70 are employed, which extend in the X-direction from the slide 64 to one or the other of the side main frame members 40, 42. A Z-shaped mounting bracket 72, together with associated nuts 62 and bolts 60 connect an end of the clamp frame member 70 to one channel 66 of the slide 64. A projection 74 at the other end of the clamp frame member 70 protrudes under the side frame member 42 and includes a main channel member 76 and an auxiliary slotted member 78. Another bracket 72 connects to the slotted member 78 and to a slotted channel 80 in the side frame member 42 for suspending the outer end of the clamp frame member 70.

As shown in FIG. 4 and also in FIG. 2, a pair of long left and right side members 82 and two pairs of short left and right side members 84 are supported between the clamp frame members 46 and 48, or, in this instance, between those transverse clamping frame members and the auxiliary clamping frame members 70. Here, the two pair of shorter side members 84 are disposed to the right of the center frame section 50, while the one pair of longer side members 82 is disposed to the left.

As shown in FIG. 4, each of the left and right side members 84 is of a telescoping configuration, with side frame ends 86 which are mirror images of one another and a center tube 88 that slidably fits into the associated side frame ends. Mounting plates 90 are situated at the ends of the side frame ends 86 and permit mounting by means of bolts 60 and channel nuts 62 to the main channel 76 of the transverse auxiliary clamp frame members 70, or to a like channel that is provided on the transverse clamp frame members 46, 48. As also shown in FIG. 4, there are horizontal cylinder mounting plates 92 provided on the side members 82, 84, and vertical pneumatic cylinder mounting plates 94 positioned on the transverse auxiliary clamp frame members 70. As shown in FIG. 4, each of these plates 92, 94 serves to mount a pneumatic cylinder clamp actuator 96, which in turn holds a pin bar 98 that clamps the plastic sheet or workpiece 18 in place on the clamp frame 44.

A second embodiment of this invention is shown in FIGS. 5, 6, 7, and 8 in which similar structure is identified with the same reference numbers as employed in the first embodiment, but raised by 100. In this embodiment a thermoformer 110 has main frames 114 constructed to be substantially identical with the frames 14 described earlier. Here, a center frame section 150 is formed of a pair of side-by-side slotted channels 152 and this center frame section 150 is supported by its ends on the back and front frame members 138, 140. In this embodiment, front and back split transverse rail members 170 respectively have a front and rear right halves 171 and front and rear right halves 172. These are attached to the channels 152 of the center frame section and to the side frame channels 180 by means of brackets 72, as in the previous embodiment.

As shown in FIGS. 6 and 7, a center-facing end part 174 of each of the rail member halves 171, 172 has a flange 176 that is disposed in a vertical plane and which is spaced a short distance from the end of the rail member half.

As with the previous embodiments, the fore-and-aft or Y-dimensions positions of the right rail member halves 171 and of the left rail member halves 172 can be independently adjusted along the center frame section 150 and along the side frame channels 180. There are telescoping left and right longitudinal members 182, 184, as in the previous embodiment, and which has flanges for supporting appropriate pneumatic cylinders.

When the arrangement of this embodiment is to be used for a single large mold, the center frame section 150 can be removed and the left and right halves 171, 172, of each of the transverse rail members 170 can be united, employing a clamp bracket 190 as shown in FIG. 8. This clamp bracket 190 is formed of a pair of parallel plate members 192 having a space between them in which there is a tongue 194 or spacer. This tongue 194 fills in a space or gap 196 (FIG. 7) between the flanges 176, and these flanges 176 fit snugly into the space between the plates 192. The clamping bracket 190 can then be secured with machine screws through the holes provided.

While one specific setup arrangement is shown in FIGS. 1 and 2, and another specific setup is shown in FIG. 5, there are many combinations of mold setups that can be used with these frames, i.e. one, two, three, four or more molds can be employed all at the same time. The auxiliary frame of this invention achieves extreme versatility for the rotary thermoformer. There is an enormous saving of machine time, and more efficient use of heat and workpiece blanks, a reduction of operator idle time, and savings in terms of labor, turn over, and overall changeover time. This is achieved at a relatively small cost in terms of increased setup time, as the additional or auxiliary frame members disclosed here can be easily attached or removed, when necessary.

While this invention has been described in detail with reference to selected preferred embodiments, it should be understood that the invention is not limited to those embodiments. Rather, many modifications and variations would present themselves to those of skill in the art without departing from the scope and spirit of this invention as defined in the appended claims.

What is claimed is:

1. A split auxiliary frame for a rotary vacuum molding thermoformer in which a plurality of identical main frames are arranged in a carousel to carry thermoplastic workpieces from a loading station to a heating station, thence to a vacuum molding station, and thence to an unloading station, wherein each of said main frames has a back frame member, a front frame member, and left and right side frame members together defining a horizontal rectangular configuration; the auxiliary frame comprising a center auxiliary frame member having ends removably mounted onto said front and back main frame members and disposed parallel to said side frame members; a back transverse rail and a front transverse rail each having left and right ends adjustably mounted onto said left and right side frame members respectively and disposed parallel to said front and back frame members; a first pair of longitudinal rails disposed to the left of said center auxiliary frame member and a second pair of longitudinal rails disposed to the right thereof, and each supported between said back and front transverse rails; and clamping means disposed on said longitudinal rails and on said transverse rails, for removably clamping said workpieces in said frame as the workpieces are carried from the loading station to the unloading station.

2. A split auxiliary frame according to claim 1 wherein said center frame member includes front and back channel mounts affixed respectively on said front and back main frame members, and front and back feet removably secured onto the channel mounts such that the position of the center frame member is adjustable along the length of said channel mounts.

3. A split auxiliary frame according to claim 1 wherein said center frame member includes a rail and a channel slide that is slidably adjustable along the length of the center frame member rail, and at least one auxiliary transverse rail that is supported at one end in said channel slide and at its other end in one of said side frame members.

4. A split auxiliary frame according to claim 1, wherein said front and back transverse rails are each in the form of separate left and right transverse rail halves, with left ends of the right transverse rail halves supported on said center frame member and with right ends of the left transverse rail halves supported on said center frame member.

5. A split auxiliary frame according to claim 4 wherein said center frame member including two side-by-side channels, with the left ends of the right transverse rail halves being adjustably supported in one of said channels and the right ends of the left transverse rail halves being adjustably supported in the other of said channels.

6. A split auxiliary frame according to claim 4, further comprising connector means for uniting the left and right ends of associated ones of the right and left transverse rail halves when said center frame member is removed, so that the auxiliary frame can accommodate a large workpiece.

7. A split auxiliary frame according to claim 6, wherein respective facing ends of said right and left transverse rail halves include a flange extending in a transverse plane with a gap being defined between the flanges of the respective transverse rail halves; and said connector means includes a pair of parallel plates with a space therebetween to fit over said flanges and to fasten thereto, and a spacer affixed between said plates and dimensioned to fill said gap between said flanges.

* * * * *